US010156339B2

(12) United States Patent
Lee et al.

(10) Patent No.: US 10,156,339 B2
(45) Date of Patent: Dec. 18, 2018

(54) MOISTURE REMOVING APPARATUS FOR HEADLIGHT

(71) Applicant: HYUNDAI MOTOR COMPANY, Seoul (KR)

(72) Inventors: Sang Shin Lee, Suwon-si (KR); Jae Woo Park, Ansan-si (KR); So Yoon Park, Suwon-si (KR); Man Ju Oh, Yongin-si (KR); Jae Woong Kim, Hwaseong-si (KR); So La Chung, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/495,545

(22) Filed: Apr. 24, 2017

(65) Prior Publication Data

US 2018/0128445 A1 May 10, 2018

(30) Foreign Application Priority Data

Nov. 9, 2016 (KR) ........................ 10-2016-0148689

(51) Int. Cl.

*B60Q 1/00* (2006.01)
*C25B 9/06* (2006.01)
*F21S 45/50* (2018.01)
*F21S 45/10* (2018.01)

(52) U.S. Cl.

CPC ............... *F21S 45/50* (2018.01); *F21S 45/10* (2018.01)

(58) Field of Classification Search

CPC ....... F21S 48/332; F21S 48/335; F21S 48/337
See application file for complete search history.

(56) References Cited

U.S. PATENT DOCUMENTS

2015/0070927 A1* 3/2015 Kurahashi ............. F21S 48/335 362/546

FOREIGN PATENT DOCUMENTS

| | | | |
|---|---|---|---|
| JP | H07275641 | | 10/1995 |
| JP | 2014161760 | A | 9/2014 |
| KR | 10-1998-0044556 | | 9/1998 |
| KR | 20090043223 | A | 5/2009 |
| WO | WO2013/175538 | A1 | 11/2013 |

OTHER PUBLICATIONS

KIPO Office Action dated Nov. 20, 2017 in connection with Korean Patent Application No. 10-2016-0148689.

* cited by examiner

*Primary Examiner* — Anabel Ton
(74) *Attorney, Agent, or Firm* — McDonnell Boehnen Hulbert & Berghoff LLP

(57) ABSTRACT

Disclosed is a moisture-removing apparatus for a headlight, the apparatus comprising: a moisture decomposition module having a first electrode that is exposed inside a headlight housing and is connected to a first electrode of a power source; a second electrode that is connected to a second electrode of the power source; and an electric discharge air path in the space between the surface of the first electrode and the surface of the second electrode; and a moisture-absorbing layer; wherein the first electrode of the moisture decomposition module is coated with a dielectric material on a surface thereof; and wherein the moisture-absorbing layer is configured to correspond to a shape of one of the first and second electrodes of the moisture decomposition module, and to come into surface contact with one of the first and second electrodes of the moisture decomposition module.

13 Claims, 4 Drawing Sheets

MOISTURE REMOVING APPARATUS FOR HEADLIGHT

CROSS REFERENCE TO RELATED APPLICATION

The present application claims benefit of and priority to Korean Patent Application No. 10-2016-0148689, filed Nov. 9, 2016, the entire contents of which is incorporated herein for all purposes by this reference.

BACKGROUND

Technical Field

The present disclosure relates generally to a moisture-removing apparatus for a headlight. More particularly, the present disclosure relates to a moisture-removing apparatus for a headlight, the apparatus being capable of removing moisture condensed in a vehicle headlight by electrolysis.

Description of the Related Art

In general, light emitted from a light source inside a headlight of a vehicle can generate heat and thus heat up an interior of the headlight to a high temperature. Due to the difference in temperature between the headlight housing cooled by driving wind or a vehicle's surrounding environment and the heated interior of the headlight, moisture inside the headlight can easily reach a condensation point, thereby forming condensation on the inside of the headlight lens. When condensation appears as droplets of water that flow down the inside of the headlight lens, the surrounding parts are corroded and damaged. In addition, the droplets of water are repeatedly condensed and evaporated, thereby forming fog on the headlight lens while leaving a trail on the surface of the headlight lens and thus reducing intensity of illumination of the headlight.

In an effort to resolve the above problems, a method of installing a fan or the like in the inside of the headlight to forcibly circulate inside air, or of sealing the inside of the headlight by a vacuuming process, was adopted in the prior art. However, use of fan installed inside the headlight requires additional energy for driving the fan. When the inside of the headlight is vacuumized, the unit price of the headlight is increased, and the cost to repair the headlight also increases because the entire headlight must be replaced even when only the light source needs to be replaced.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure addresses the above problems occurring in the related art, and describes a moisture-removing apparatus for a headlight, the apparatus being capable of removing moisture in a headlight housing by electrolysis, thereby fundamentally solving the problem of moisture condensation inside the headlight and preventing performance degradation of the headlight.

In order to achieve the above object, according to one aspect of the present disclosure, there is provided a moisture-removing apparatus for a headlight, the apparatus comprising: a moisture decomposition module having a first electrode that is connected to a first electrode of a power source; a second electrode that is connected to a second electrode of the power source; and an electric discharge air path provided between the surface of the first and second electrodes of the moisture decomposition module; and a moisture-absorbing layer. The first electrode of the moisture decomposition module is exposed inside a headlight housing, and is coated with a dielectric material on a surface thereof. The second electrode of the moisture decomposition module is also exposed inside the headlight housing, and is spaced apart from the first electrode by a predetermined distance so as to define a space therebetween. The moisture-absorbing layer may be made of a material such as paper, and is configured to correspond to the shape of one of the first and second electrodes of the moisture decomposition module and to come into surface contact with one of the first and second electrodes of the moisture decomposition module. Moisture of the air inside the headlight is decomposed by an electric discharge occurring between the first and second electrodes of the moisture decomposition module as the air inside the headlight circulates in the electric discharge air path.

The first and second electrodes of the moisture decomposition module may be provided parallel to each other in a plate shape.

In an example embodiment, there may be a plurality of moisture decomposition modules arranged such that surfaces of first and second electrodes thereof face each other, and moisture-absorbing layers may be arranged between the plurality of moisture decomposition modules so as to come into surface contact with each other.

The first and second electrodes may be placed where the headlight lens and the headlight housing are coupled to each other.

The first and second electrodes may be provided so as to come into linear contact with both the headlight lens and the headlight housing, wherein contact lines famed between the first and second electrodes and the headlight lens may extend vertically (i.e. along the axis from the top to the bottom of the headlight).

A first end of the moisture-absorbing layer may extend to come into surface contact with a surface of a headlight lens.

A second end of the moisture-absorbing layer may extend to come into surface contact with a surface of the headlight housing.

Each of the first and second electrodes of the moisture decomposition module may be provided with a plurality of ventilation holes.

The ventilation holes of the first and second electrodes of the moisture decomposition module may be arranged alternately to be offset from each other.

The dielectric material may be an ionomer.

The dielectric material may be made by impregnating a polytetrafluoroethylene ("PTFE") membrane with an ionomer.

According to an example embodiment of the moisture-removing apparatus for the headlight of the present disclosure with the above-described configuration, it is possible to remove moisture condensed inside the headlight, thereby preventing performance degradation of the headlight. Thus, it is possible to prevent moisture from being condensed when air having high humidity is introduced inside the headlight during replacement or maintenance of the headlight.

In addition, it is possible to decompose moisture where condensation of moisture is most generated, by disposing the apparatus where the headlight lens and the headlight housing are coupled to each other, and by collecting moisture in the moisture decomposition module by using the moisture-absorbing layer.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
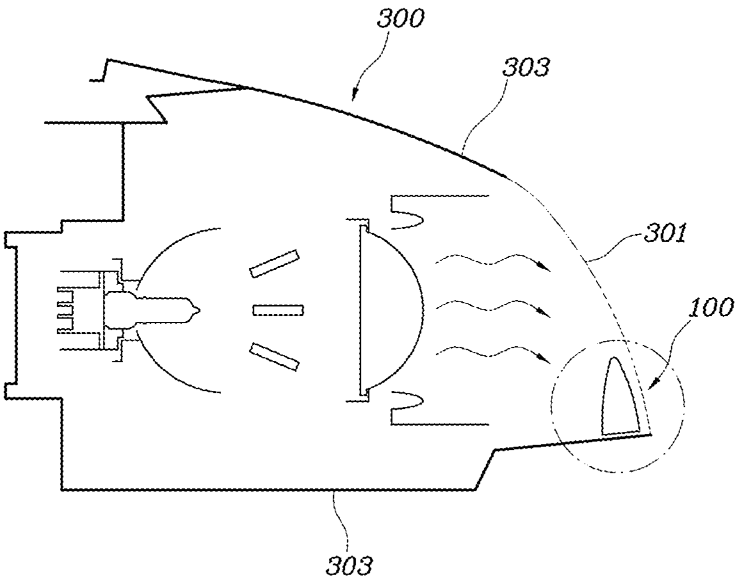
FIG. 1 is a view showing a configuration of a moisture-removing apparatus for a headlight according to an example embodiment of the present disclosure.

Hereinbelow, example embodiments of the present disclosure are described in detail with reference to the accompanying drawings. Throughout the drawings, the same reference numerals will refer to the same or like parts.

Figure 2:
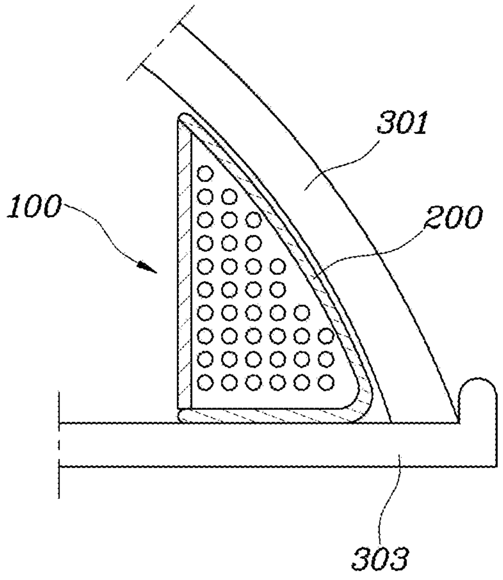
FIG. 2 is an enlarged view showing the moisture-removing apparatus for the headlight according to an example embodiment of the present disclosure.
Figure 3:
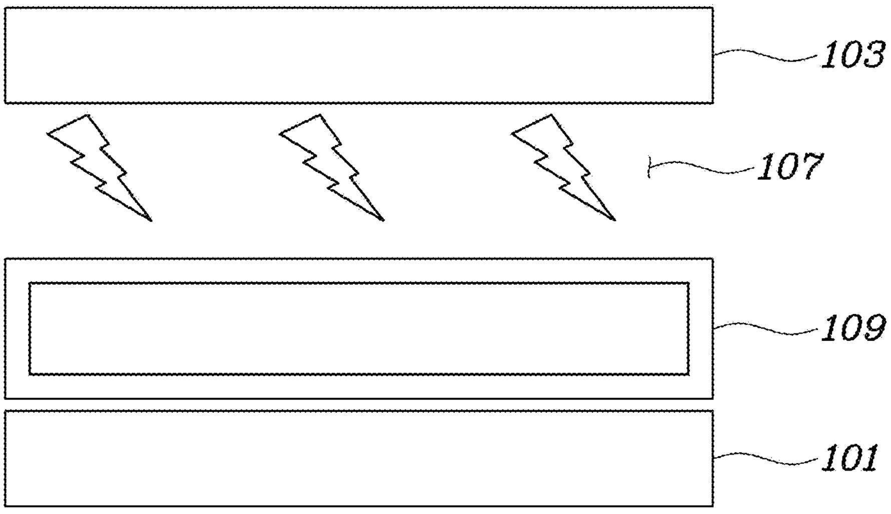
FIG. 3 is a view showing a basic structure of the moisture-removing apparatus for the headlight according to an example embodiment of the present disclosure.
Figure 4:
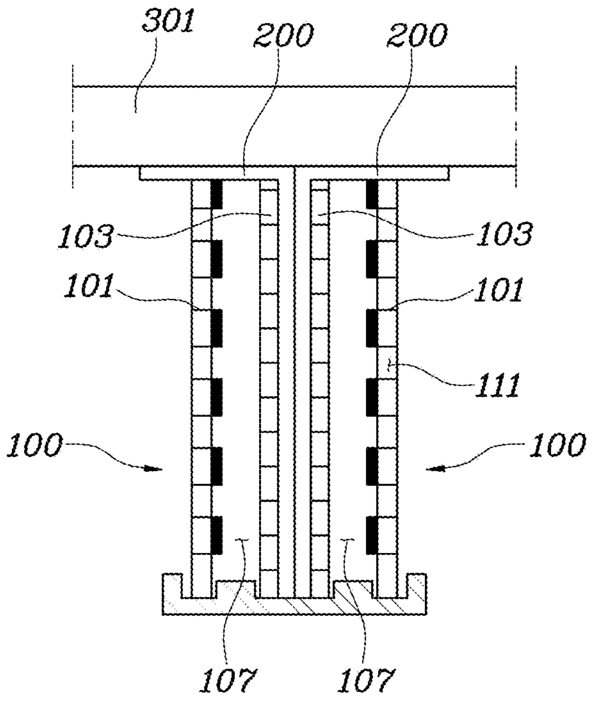
FIG. 4 is a cross-sectional view showing the moisture-removing apparatus for the headlight according to an example embodiment of the present disclosure.
Figure 5:
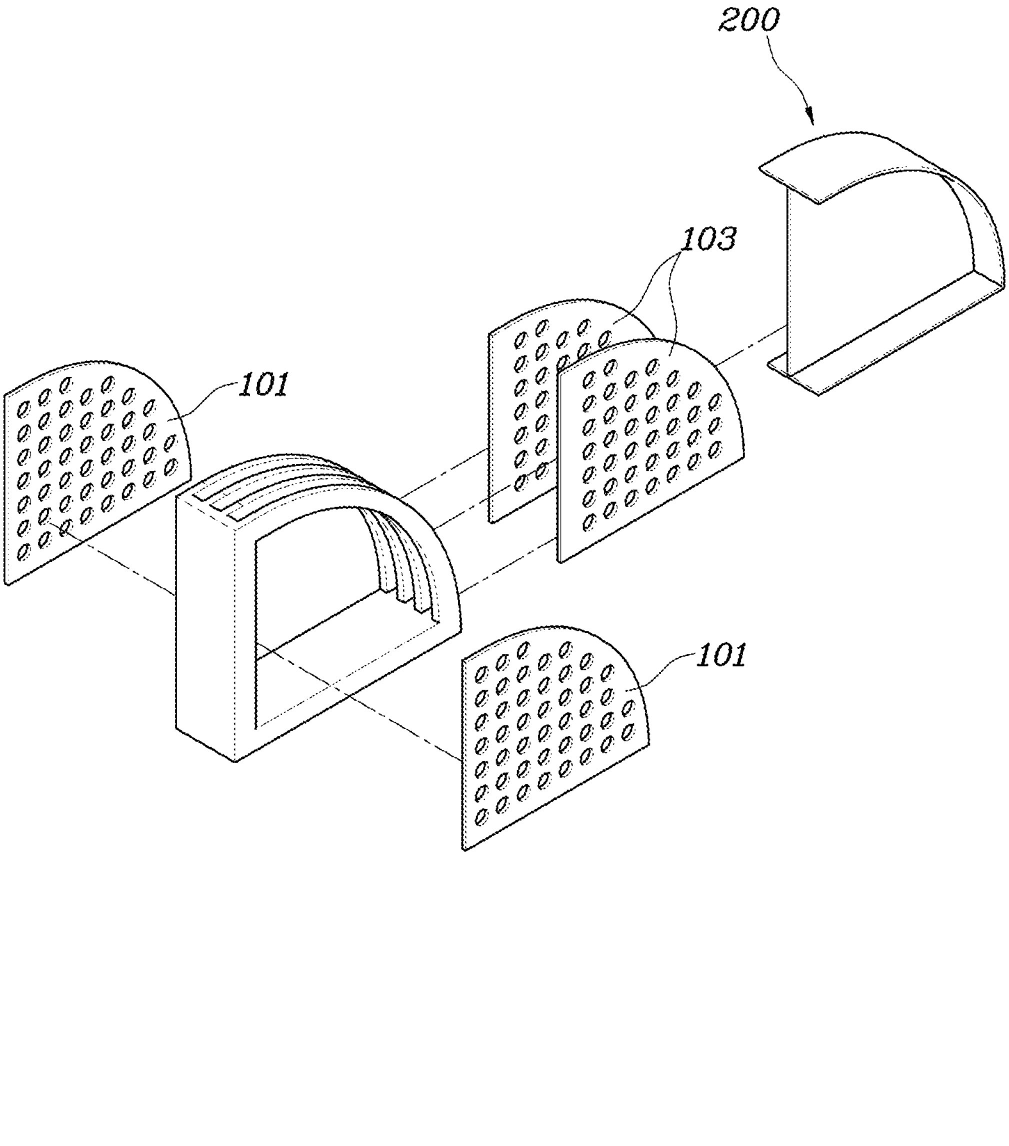
FIG. 5 is an exploded perspective view showing the moisture-removing apparatus for the headlight according to an example embodiment of the present disclosure.

FIG. 1 is a view showing the configuration of a moisture-removing apparatus for a headlight according to an example embodiment. FIG. 2 is an enlarged view showing the moisture-removing apparatus for the headlight according to an example embodiment. FIG. 3 is a view showing a basic structure of the moisture-removing apparatus for the headlight according to an example embodiment. FIG. 4 is a cross-sectional view showing the moisture-removing apparatus for the headlight according to an example embodiment. FIG. 5 is an exploded perspective view showing the moisture-removing apparatus for the headlight according to an example embodiment.

The moisture-removing apparatus for the headlight according to the present an example embodiment of the present disclosure comprises: a moisture decomposition module 100 including a first electrode 101 that is connected to one electrode of a power source; a second electrode 103 that is connected to a remaining electrode of the power source; an electric discharge air path 107 provided between the surface of first electrode 101 and the second electrode 103; and a moisture-absorbing layer 200. First electrode 101 is exposed inside a headlight housing 303, and is coated with a dielectric material 109 on a surface thereof. Second electrode 103 is exposed inside headlight housing 303, and is spaced apart from first electrode 101 by a predetermined distance so as to define a space therebetween. First and second electrodes 101 and 103 may be disposed parallel to each other in a plate shape. Moisture of the air inside headlight 300 is decomposed by an electric discharge occurring between first and second electrodes 101 and 103 while air inside headlight 300 circulates in the electric discharge air path 107. The moisture-absorbing layer is configured to correspond to the shape of one of first and second electrodes 101 and 103 of the moisture decomposition module 100, and to come into surface contact with one of first and second electrodes 101 and 103 of the moisture decomposition module 100.

When a driver drives a vehicle at night, headlight 300 is used to secure a driver's view by using light emitted from a light source of headlight 300. During operation of headlight 300, the inside of headlight 300 is heated by heat radiated from the light source, thereby maintaining a high temperature state. Thus, even when moisture is present inside headlight 300, the moisture typically remains in a gaseous state, and moisture therefore does not condense on the inner surface of headlight 300. However, because the outside of the headlight 300 is cooled by heat exchange with the atmosphere, moisture may condense on the inner surface of headlight 300.

When the vehicle is parked in an outdoor area directly exposed to sunlight, the temperature inside headlight 300 gradually increases due to the greenhouse effect, and thus moisture present in the inside headlight 300 may evaporate and diffuse evenly therein. On the other hand, if the outside of headlight 300 reaches a lower temperature than the inside of headlight 300 due to heat exchange with the atmosphere, the diffused moisture may condense on the inner surface of headlight 300.

At this time, when the condensed moisture is formed as water droplets that flow down in headlight 300, there is a possibility that the surrounding parts may be corroded and damaged, and as the water droplets are repeatedly condensed and evaporated, headlight lens 301 may be fogged up while the water droplets leave trails on a surface of headlight lens 301, thereby diminishing the intensity of illumination of headlight 300.

To solve such problems, humidity inside headlight 300 should be kept low. To this end, it is possible to assemble headlight 300 in a completely dehumidified space so as to block an inflow of moisture from the beginning. However, when replacement of a bulb or maintenance of headlight 300 is performed, the inflow of moisture can occur at any time. Thus, there is a need to reduce humidity inside headlight 300 afterwards.

There are two ways to lower humidity in the air: one is to lower relative humidity by raising the temperature of the air, and the other is to lower absolute humidity by removing moisture from air. Lowering the relative humidity cannot be a solution to the above problems because moisture may condense again inside headlight 300 when the temperature inside headlight 300 is decreased. Thus, the present disclosure is intended to remove moisture (and thereby lower absolute humidity) inside headlight 300 by electrolysis.

In general, electrolysis of water is performed by disposing electrodes in water-containing electrolytes. However, because the amount of water inside headlight 300 typically is not sufficient to conduct electricity, it is impossible to perform conventional electrolysis in headlight 300.

Accordingly, the present disclosure is intended to decompose moisture in the air inside headlight 300 by inducing electric discharge at low voltage.

As shown in FIGS. 3 and 4, first electrode 101 of moisture decomposition module 100 is connected to the first electrode of the power source and is arranged to be exposed inside headlight 300, and second electrode 103 of the moisture decomposition module 100 is arranged to be spaced apart from first electrode 101 by a predetermined distance. Electric current flows in a connected conducting wire, but if high voltage is applied to disconnected wires, electric discharge also occurs in which electrons are transferred by passing through an empty space between the disconnected wires. However, it is difficult to ensure a high enough voltage sufficient to induce electric discharge directly in a vehicle. In addition, it is not desirable to induce electric discharge through high voltage in the vehicle in which a plurality of electronic components exists, and thus it is necessary that electric discharge occur at low voltage.

This is the role of dielectric material 109 coated on first electrode 101. Dielectric material 109 allows electric discharge to occur uniformly over an entire surface of first and second electrodes 101 and 103 and to facilitate emission of electrons, thereby inducing electric discharge even at low voltage.

First and second electrodes 101 and 103 are spaced apart from each other so as to define the space between the surface of first electrode 101 coated with the dielectric material 109 and second electrode 103, thereby providing the electric discharge air path 107 in which air inside headlight 300 can flow. Electric discharge occurs in electric discharge air path 107 while air inside headlight 300 circulates in electric discharge path 107, and the moisture of the air inside headlight 300 is decomposed by electrolysis. Thus, absolute humidity of the air inside the headlight 300 can be reduced.

However, in some situations, moisture condenses on the surrounding components before all of moisture of the air inside headlight 300 passes moisture decomposition module 100 and is decomposed. In particular, when moisture comes into contact with a component such as headlight lens 301 or headlight housing 303 that is lower in temperature than the dew point of air inside headlight 300, moisture may condense before being decomposed in moisture decomposition module 100. Of course, if moisture is removed continuously through moisture decomposition module 100, the condensed moisture is evaporated again and thus moisture can be decomposed and removed through moisture decomposition module 100. However, this process can take a significant amount of time.

Accordingly, in the present disclosure, as shown in FIGS. 4 and 5, moisture-absorbing layer 200 is disposed such that moisture condensed on headlight lens 301 or headlight housing 303 is absorbed by moisture-absorbing layer 200, whereafter the absorbed moisture is fed to moisture decomposition module 100. Thus, it is possible to quickly remove moisture inside headlight 300.

In a further example embodiment, a plurality of moisture decomposition modules 100 may be arranged such that surfaces of first and second electrodes 101 and 103 thereof face each other, and moisture-absorbing layers 200 may be arranged between the plurality of moisture decomposition modules so as to come into surface contact with each other.

In general, the electrodes of moisture decomposition modules 100 can generate heat because electric power is supplied thereto while the driver drives the vehicle. If moisture-absorbing layer 200 is arranged so as to come into surface contact with first and second electrodes 101 and 103, moisture absorbed by moisture-absorbing layer 200 is evaporated again by heat generated from the electrodes, whereby the evaporated moisture can be decomposed and removed in moisture decomposition modules 100.

As such, by arranging moisture-absorbing layer 200 between moisture decomposition modules 100, it is possible to increase heat generated from first and second electrodes 101 and 103 of moisture decomposition modules 100 in such a manner that the speed at which moisture absorbed by moisture-absorbing layer 200 is evaporated will be further accelerated.

First and second electrodes 101 and 103 of moisture decomposition module 100 may be disposed where headlight lens 301 and headlight housing 303 are coupled to each other. In this configuration, first and second electrodes 101 and 103 come into linear contact with both headlight lens 301 and headlight housing 303, and vertical contact lines are formed between first and second electrodes 101 and 103 and the headlight lens 301.

One place where moisture is most concentrated in headlight 300 is headlight lens 301, which is affected by external temperature. Accordingly, it may be most effective to dispose moisture decomposition modules 100 at the position shown in FIGS. 1 and 2. Moisture must be continuously fed to moisture decomposition modules 100, otherwise decomposition of moisture will not efficiently occur. Thus, first and second electrodes 101 and 103 of moisture decomposition modules 100 are arranged in a vertical orientation.

A first end of moisture-absorbing layer 200 may extend to come into surface contact with the surface of headlight lens 301. A second end of moisture-absorbing layer 200 may extend to come into surface contact with the surface of headlight housing 303.

As shown in FIGS. 4 and 5, by extending the ends of moisture-absorbing layer 200 in the directions of both headlight lens 301 and headlight housing 303, moisture condensed on headlight lens 301 and headlight housing 303 can be absorbed and decomposed quickly.

Each of the first and second electrodes 101 and 103 of moisture decomposition module 100 may include a plurality of ventilation holes 111. In a further example embodiment, ventilation holes 111 of first and second electrodes 101 and 103 of moisture decomposition module 100 may be arranged alternately to be offset from each other, as shown in FIG. 5.

Electric discharge air path 107 provided between first and second electrodes 101 and 103 of moisture decomposition module 100 is narrow in width. Accordingly, when the distance between first and second electrodes 101 and 103 is increased, the amount of air (a nonconductive material) is increased, thereby resulting in an increase in electric resistance and rendering it difficult to perform electric discharge at low voltage. Accordingly, the distance between first and second electrodes 101 and 103 is preferably equal to or less than about 100 micrometers . In this case, air inside headlight 300 may not efficiently flow to electric discharge air path 107.

Accordingly, in the present disclosure, as shown in FIGS. 4 and 5, each of the first and second electrodes 101 and 103 itself is provided with ventilation holes 111 so that air inside headlight 300 can efficiently flow to electric discharge air path 107. In addition, ventilation holes 111 provided in the first and second electrodes 101 and 103 are arranged alternately to be offset from each other rather than being aligned with each other, thereby increasing the time period for which air introduced through ventilation holes 111 stays in electric discharge air path 107. Thus, moisture of the air inside headlight 300 can be efficiently decomposed for a sufficient time.

Moreover, ventilation holes 111 function to feed evaporated moisture, which is produced when absorbed moisture in moisture-absorbing layer 200 is evaporated by the heat of first electrode 101 or second electrode 103, to electric discharge air path 107.

Dielectric material 109 should function to enable electric discharge to occur at low voltage by helping movement of electrons.

In an example embodiment, dielectric material 109 may be an ionomer.

The ionomer denotes a polymer that comprises a cationic group or an anionic group. Specifically, the ionomer is a thermoplastic material having covalent bonding and ionic bonding at the same time, and having excellent electrostatic force. The ionomer has the electric conductivity properties of dielectric material 109 and acts as an insulator as a polymer plastic material, but it also plays a role of helping movement of electrons on the basis of electrostatic force to enable electric discharge at low voltage.

In a further example embodiment, dielectric material 109 may be made by impregnating a polytetrafluoroethylene (PTFE) membrane with the ionomer.

Dielectric material 109 as described above is necessary to provide durability and to maintain performance even when exposed to temperature changes, moisture levels, and vibration levels for a long period of time due to characteristics of the apparatus mounted inside headlight 300 of a vehicle.

Thus, in a further example embodiment of the present disclosure, PTFE having excellent coating adhesion while chemical properties are retained at a high temperature (equal to or greater than 300° C.), namely a porous Teflon membrane, is impregnated with the ionomer and coated on the electrode. With this ionomer-impregnated PTFE coating, it is possible to improve durability of coating of dielectric material 109 while maintaining the excellent electrostatic force of the ionomer.

Although preferred embodiments have been described for illustrative purposes, those skilled in the art will appreciate that various modifications, additions and substitutions are possible, without departing from the scope and spirit of the disclosure.

What is claimed is:

1. An apparatus for removing moisture from a headlight, the apparatus comprising:

a moisture decomposition module having a first electrode having a surface and an edge that is exposed inside a headlight housing and is connected to a first electrode of a power source; a second electrode having a surface and an edge that is connected to a second electrode of the power source; and an electric discharge air path in the space between the surface of the first electrode and the surface of the second electrode; and a moisture-absorbing layer;

wherein the first electrode of the moisture decomposition module is coated with a dielectric material on the surface thereof; and wherein the moisture-absorbing layer is configured to correspond to a shape of one of the first and second electrodes of the moisture decomposition module, and to come into contact with one of the first and second electrodes of the moisture decomposition module at the surface thereof.

2. The apparatus of claim 1, wherein the first and second electrodes of the moisture decomposition module have a plate shape and are disposed parallel to each other.

3. The apparatus of claim 2, comprising a plurality of moisture decomposition modules.

4. The apparatus of claim 3, wherein the plurality of moisture decomposition modules are arranged such that surfaces of first and second electrodes of the moisture decomposition modules face each other, and a plurality of moisture-absorbing layers are arranged between the plurality of moisture decomposition modules so as to come into surface contact with each other.

5. The apparatus of claim 2, wherein the first and second electrodes of the moisture decomposition module are disposed where a headlight lens and the headlight housing are coupled to each other.

6. The apparatus of claim 5, wherein the first and second electrodes are disposed so as to come into linear contact with both the headlight lens and the headlight housing.

7. The apparatus of claim 6, wherein vertical contact lines are formed between the first and second electrodes of the moisture decomposition modules and the headlight lens.

8. The apparatus of claim 1, wherein a first end of the moisture-absorbing layer extends to come into surface contact with a surface of a headlight lens.

9. The apparatus of claim 1, wherein a second end of the moisture-absorbing layer extends to come into surface contact with a surface of the headlight housing.

10. The apparatus of claim 2, wherein each of the first and second electrodes of the moisture decomposition module includes a plurality of ventilation holes.

11. The apparatus of claim 10, wherein the plurality of ventilation holes of the first electrode of the moisture decomposition module is arranged to be offset from the plurality of ventilation holes of the second electrode of the moisture decomposition module.

12. The apparatus of claim 1, wherein the dielectric material is an ionomer.

13. The apparatus of claim 1, wherein the dielectric material is made by impregnating a polytetrafluoroethylene membrane with an ionomer.

* * * * *